Sept. 14, 1926.

R. T. PIERCE

ELECTRICAL MEASURING INSTRUMENT

Filed August 9, 1924

1,599,585

WITNESSES:

INVENTOR
Raymond T. Pierce.
BY
ATTORNEY

Patented Sept. 14, 1926.

1,599,585

UNITED STATES PATENT OFFICE.

RAYMOND T. PIERCE, OF EAST PITTSBURGH, PENNSYLVANIA, ASSIGNOR TO WESTINGHOUSE ELECTRIC & MANUFACTURING COMPANY, A CORPORATION OF PENNSYLVANIA.

ELECTRICAL MEASURING INSTRUMENT.

Application filed August 9, 1924. Serial No. 731,141.

My invention relates to electrical measuring instruments and particularly to instruments of the dynamometer type.

One object of my invention is to provide an electrical measuring instrument that shall be sensitive or, in other words, shall give a relatively large deflection for small changes in the characteristics of the applied voltage.

Another object of my invention is to provide a frequency meter of this type that shall be exceptionally sensitive to changes of frequency or power factor.

In accordance with my invention, the movable element of the meter comprises two coils fixed at right angles to each other, and a third coil so connected as to oppose the field of one of the first-mentioned coils and positioned with its axis coincident with said first-mentioned coil. By reason of this arrangement of the coils, a large change in the resultant field is produced upon a change of the characteristics of the voltage applied to the coils.

Figure 1:
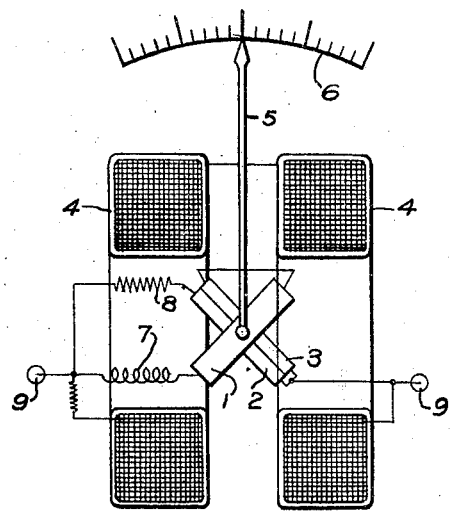
Figure 2:
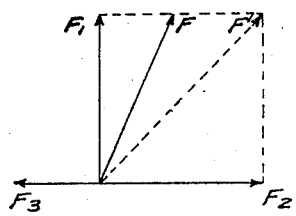
Figure 3:
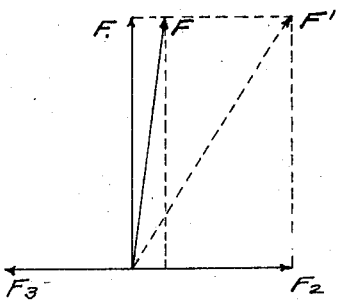

For a better understanding of my invention, reference may be had to the accompanying drawings, wherein Figure 1 is a diagrammatic view of a frequency meter embodying my invention;

Fig. 2 is a vector diagram of the magnetic fields produced by the currents traversing the respective coils of the instrument shown in Fig. 1; and Fig. 3 is a vector diagram of the same quantities under different conditions.

Referring to Fig. 1, the instrument comprises movable coils 1, 2 and 3 disposed in such position as to intercept the magnetic field produced when current traverses a stationary coil 4. The coils 2 and 3 are fixed at right angles to the coil 1, and the coil 3 is oppositely wound with respect to the coil 2. A pointer 5, that is attached to the coils 1, 2 and 3, may be employed in cooperation with a scale 6 to facilitate reading the instrument deflection. A reactor 7 is connected in series with the movable coils 1 and 3, and a resistor 8 is connected in series with the movable coil 2. The stationary coil 4 is bridged across the line terminals 9.

Assuming that the instrument is to be employed as a frequency meter, it is connected to the circuit by the terminals 9. As the frequency of the applied voltage changes, the current through the coils 1, 2 and 3 changes by reason of the variation of the reactance of the reactor 7. Accordingly, the resultant magnetic field produced by current traversing the movable coils 1, 2 and 3 changes, and produces a change in the resultant torque between the movable coils and the field coil 4, thereby deflecting the pointer 5 to provide an indication of the change of frequency. Since the magnetic field produced by the current traversing the coil 3 opposes the magnetic field incident to the current traversing the coil 2, a relatively large change in the resultant magnetic field and, therefore, a relatively large deflection of the pointer 5 is obtained for a given change of frequency.

The theory of operation is as follows:

Referring to Fig. 2, $F_1$, $F_2$ and $F_3$ represent the magnetic fields produced by the currents traversing the coils 1, 2 and 3, respectively, magnetic field $F_2$ being in the opposite direction from magnetic field $F_3$. The resultant magnetic field is represented by F. If the coil 3 is omitted, the resultant magnetic field produced by the currents traversing coils 1 and 2 is represented by $F'$.

Upon a change in frequency, magnetic fields $F_1$ and $F_3$ change in magnitude because of the change in reactance of the reactor 7. Thus, as shown in Fig. 3, if the frequency decreases, magnetic fields $F_1$ and $F_3$ become greater by reason of the increase of current through the reactor 7. The resultant magnetic field is represented by F. The resultant magnetic field of the coils 1 and 2 only is represented by $F'$. The deflection of the pointer is dependent upon the angle through which the resultant magnetic field has moved. It will be apparent that the direction of the resultant magnetic field has moved through a larger angle than it would have moved if the coil 3 had been omitted. Consequently, the addition of the coil 3 produces a marked increase in the sensitivity of the instrument.

While I have described my invention particularly as applied to a frequency meter, it may also be applied to other instruments of the dynamometer type. Furthermore, I do not consider that my invention is limited to the structural details shown and described, as various modifications thereof may be made without departing from the spirit of my invention. Accordingly, I do not wish my invention to be limited in scope except as set forth in the appended claims.

I claim as my invention:

1. An instrument comprising two coils at right angles, a resistance in series with one of said coils, a reactance in series with the other of said coils, and a third coil in series with said reactance having its axis coincident with the axis of the first named coil.

2. An instrument of the dynamometer type comprising means for producing a magnetic field and a movable element positioned in said field, said element comprising two coils having coincident axes and a third coil having its axis at right angles to said axes, a resistance connected in series with one of said two coils and a reactance connected in series with both of the other coils.

In testimony whereof, I have hereunto subscribed my name this 2nd day of August 1924.

RAYMOND T. PIERCE.